US012705805B2

(12) United States Patent
Yu et al.

(10) Patent No.: US 12,705,805 B2
(45) Date of Patent: Aug. 11, 2026

(54) GENERATION OF LATENT REPRESENTATIONS OF IMAGES USING A MACHINE LEARNING MODEL

(71) Applicant: Lemon Inc., Grand Cayman (KY)

(72) Inventors: Qihang Yu, Los Angeles, CA (US); Mark Weber, Los Angeles, CA (US); Xueqing Deng, Los Angeles, CA (US); Xiaohui Shen, Los Angeles, CA (US); Liang-Chieh (Jay) Chen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 107 days.

(21) Appl. No.: 18/738,754

(22) Filed: Jun. 10, 2024

(65) Prior Publication Data

US 2025/0378591 A1 Dec. 11, 2025

(51) Int. Cl.
*G06T 11/00* (2026.01)
*G06T 9/00* (2006.01)

(52) U.S. Cl.
CPC ................ *G06T 11/00* (2013.01); *G06T 9/00* (2013.01)

(58) Field of Classification Search
CPC .................................. G06T 11/00; G06T 9/00
See application file for complete search history.

(56) References Cited

U.S. PATENT DOCUMENTS

2023/0351558 A1* 11/2023 Chen ......................... G06T 5/77
2024/0112088 A1* 4/2024 Yu ......................... G06N 3/0455

OTHER PUBLICATIONS

Stabilityai/sd-vae-ft-ema; https://huggingface.co/stabilityai/sd-vae-fl-ema; Hugging Face; accessed Apr. 17, 2025; 6 pages.
Alayrac et al.; "Flamingo: a Visual Language Model for Few-Shot Learning"; 36th Conference on Neural Information Processing Systems; 2022; 21 pages.
Bai et al.; "Sequential Modeling Enables Scalable Learning for Large Vision Models"; IEEE/CVF Conf. on Computer Vision and Pattern Recognition; 2024; p. 22861-22872.
Bao et al.; "All Are Worth Words: A ViT Backbone for Diffusion Models"; IEEE/CVF Conf. on Computer Vision and Pattern Recognition; 2023; p. 22669-22679.
Bao et al.; "BEiT: BERT Pre-Training of Image Transformers"; ICLR; arXiv:2106.08254; Sep. 2022; 18 pages.
Besnier et al.; "A Pytorch Reproduction of Masked Generative Image Transformer"; arXiv:2310.14400; Oct. 2023; 8 pages.
Carion et al.; "End-to-End Object Detection with Transformers"; ECCV; arXiv:2005.128723; May 2020; 6 pages.

(Continued)

*Primary Examiner* — Yassin Alata
(74) *Attorney, Agent, or Firm* — BakerHostetler

(57) ABSTRACT

The present disclosure describes techniques for generating latent representations of images using a machine learning model. An image is split and flattened into a series of patches. The series of patches is concatenated with a sequence of latent tokens. The concatenated patches and latent tokens are input into an encoder of the machine learning model. A one-dimensional (1D) latent representation of the image is generated by the encoder. Vector quantization is performed on the 1D latent representation of the image by a vector quantizer of the machine learning model to generate quantized latent tokens. The image is reconstructed based on the quantized latent tokens by a decoder of the machine learning model.

20 Claims, 12 Drawing Sheets

(56) References Cited

OTHER PUBLICATIONS

Chang et al.; "Muse: Text-To-Image Generation via Masked Generative Transformers"; ICML; arXiv:2301.00704; Jan. 2023; 22 pages.
Chang et al.; "MaskGIT: Masked Generative Image Transformer"; IEEE/CVF Conf. on Computer Vision and Pattern Recognition; 2022; p. 11315-11325.
Chen et al.; "Generative Pretraining From Pixels"; $37^{th}$ Int'l Conf. on Machine Learning; 2020; p. 1691-1703.
Cheng et al.; "Masked-Attention Mask Transformer for Universal Image Segmentation"; IEEE/CVF Conf. on Computer Vision and Pattern Recognition; 2022; p. 1290-1299.
Deng et al.; "ImageNet: A large-scale hierarchical image database"; IEEE Conf. on Computer Vision and Pattern Recognition; 2009; 8 pages.
Devlin et al.; "BERT: Pre-training of Deep Bidirectional Transformers for Language Understanding"; ACL Anthology; 2018; 16 pages.
Dhariwal et al.; "Diffusion Models Beat GANs on Image Synthesis"; 35th Conference on Neural Information Processing Systems; 2021; 15 pages.
Dosovitskiy et al.; "An Image is Worth 16x16 Words: Transformers for Image Recognition at Scale"; ICLR; arXiv:2010.11929; Jun. 2021; 22 pages.
El-Nouby et al; "Scalable Pre-training of Large Autoregressive Image Models"; CVPR; arXiv:2401.08541; Jan. 2024; 14 pages.
Esser et al.; "Taming Transformers for High-Resolution Image Synthesis"; IEEE/CVF Conf. on Computer Vision and Pattern Recognition; 2021; p. 12873-12883.
Gafni et al.; "Make-A-Scene: Scene-Based Text-to-Image Generation with Human Priors"; ECCV; arXiv:2203.13131; Mar. 2022; 17 pages.
Gao et al.; "Masked Diffusion Transformer is a Strong Image Synthesizer"; IEEE/CVF Conf. on Computer Vision and Pattern Recognition; 2023; p. 23164-23173.
Goodfellow et al.; "Generative Adversarial Nets"; Advances in Neural Information Processing Systems; 2014; 9 pages.
He et al.; "Masked Autoencoders Are Scalable Vision Learners"; IEEE/CVF Conf. on Computer Vision and Pattern Recognition; 2022; p. 16000-16009.
Hinton et al.; "Reducing the Dimensionality of Data with Neural Networks"; Science; vol. 313; Jul. 2006; p. 504-507.
Ho et al.; "Classifier-Free Diffusion Guidance"; Machine Learning; arXiv:2207.12598; Jul. 2022; 14 pages.
Hoogeboom et al.; "simple diffusion: End-to-end diffusion for high resolution images"; $40^{th}$ ICML; 2023; 20 pages.
Huang et al.; "Pixel-BERT: Aligning Image Pixels with Text by Deep Multi-Modal Transformers"; CVPR; arXiv:2004.00849; Jun. 2020; 17 pages.
Johnson et al.; "Perceptual Losses for Real-Time Style Transfer and Super-Resolution"; ECCV; arXiv:1603.08155; Mar. 2016; 18 pages.
Karras et al.; "A Style-Based Generator Architecture for Generative Adversarial Networks"; IEEE/CVF Conf. on Computer Vision and Pattern Recognition; 2019; p. 4401-4410.
Kingma et al.; "Auto-Encoding Variational Bayes"; ICLR; arXiv:1312.6114; May 2014; 14 pages.
Kuznetsova et al.; "The Open Images Dataset V4: Unified Image Classification, Object Detection, and Visual Relationship Detection at Scale"; Int'l Journal of Computer Vision; arXiv:1811.00982; Feb. 2020; 26 pages.
Lee et al.; "Autoregressive Image Generation Using Residual Quantization"; IEEE/CVF Conf. on Computer Vision and Pattern Recognition; 2022; p. 11523-11532.
Li et al.; "BLIP-2: Bootstrapping Language-Image Pre-training with Frozen Image Encoders and Large Language Models"; $40^{th}$ ICML; 2023; p. 19730-19742.
Li et al.; "Scaling Language-Image Pre-Training via Masking"; IEEE/CVF Conf. on Computer Vision and Pattern Recognition; 2023; p. 23390-23400.
Loshchilov et al.; "Decoupled Weight Decay Regularization"; Machine Learning; arXiv:1711.05101; Jan. 2019; 19 pages.
Mizrahi et al.; "4M: Massively Multimodal Masked Modeling"; 37th Conference on Neural Information Processing Systems; 2023; 46 pages.
Oord et al.; "Neural Discrete Representation Learning"; 31st Conference on Neural Information Processing Systems; 2017; 10 pages.
OpenAI et al.; "GPT-4 Technical Report"; arXiv:2303.08774; Mar. 2024; 100 pages.
Peebles et al.; "Scalable Diffusion Models with Transformers"; IEEE/CVF Conf. on Computer Vision; 2023; p. 4195-4205.
Podell et al.; "SDXL: Improving Latent Diffusion Models for High-Resolution Image Synthesis"; CVPR; arXiv:2307.01952; Jul. 2023; 21 pages.
Ramesh et al.; "Zero-Shot Text-to-Image Generation"; $38^{th}$ ICML; 2021; p. 8821-8831.
Razavi et al.; "Generating Diverse High-Fidelity Images with VQ-VAE-2"; 33rd Conference on Neural Information Processing Systems; 2019; 11 pages.
Rolfe et al.; "Discrete Variational Autoencoders"; ICLR; arXiv:1609.02200; Apr. 2017; 33 pages.
Rombach et al.; "High-Resolution Image Synthesis With Latent Diffusion Models"; IEEE/CVF Conf. on Computer Vision and Pattern Recognition; 2022; p. 10684-10695.
Schuhmann et al.; "LAION-5B: An open large-scale dataset for training next generation image-text models"; 36th Conference on Neural Information Processing Systems; 2022; 17 pages.
Touvron et al.; "Llama 2: Open Foundation and Fine-Tuned Chat Models"; Computation and Language; arXiv:2307.09288; Jul. 2023; 77 pages.
Van Den Oord et al.; "Neural Discrete Representation Learning"; 31st Conference on Neural Information Processing Systems; 2017; 10 pages.
Vaswani et al.; "Attention Is All You Need"; 31st Conference on Neural Information Processing Systems; 2017; 11 pages.
Vincent et al.; "Extracting and composing robust features with denoising autoencoders"; $25^{th}$ ICML; 2008; 16 pages.
Yu et al.; "Vector-quantized Image Modeling with Improved VQGAN"; ICLR; arXiv:2110.04627; Jun. 2022; 17 pages.
Yu et al.; "Scaling Autoregressive Models for Content-Rich Text-to-Image Generation"; arXiv:2206.10789; Jun. 2022; 49 pages.
Yu et al.; "MAGVIT: Masked Generative Video Transformer"; IEEE/CVF Conf. on Computer Vision and Pattern Recognition; 2023; p. 10459-10469.
Yu et al.; "Language Model Beats Diffusion—Tokenizer is Key to Visual Generation"; ICLR; arXiv:2310.05737; Mar. 2024; 19 pages.
Yu et al.; "Scaling Autoregressive Multi-Modal Models: Pretraining and Instruction Tuning"; Machine Learning; arXiv:2309.02591; Sep. 2023; 19 pages.
Yu et al.; "k-means Mask Transformer"; ECCV; 2022; 20 pages.
Zhang et al.; "The Unreasonable Effectiveness of Deep Features as a Perceptual Metric"; IEEE Conf. on Computer Vision and Pattern Recognition; 2018; p. 586-595.
Zheng et al.; "MoVQ: Modulating Quantized Vectors for High-Fidelity Image Generation"; 36th Conference on Neural Information Processing Systems; 2022; 14 pages.
Zhu et al.; "Deformable DETR: Deformable Transformers for End-to-End Object Detection"; ICLR; arXiv:2010.04159; Mar. 2021; 16 pages.

* cited by examiner

400

Split and flatten an image into a series of patches 402

Concatenate the series of patches with a sequence of latent tokens 404

Input the concatenated patches and latent tokens into an encoder of a machine learning model 406

Generate a one-dimensional (1D) latent representation of the image by the encoder 408

Perform vector quantization on the 1D latent representation of the image by a vector quantizer of the machine learning model to generate quantized latent tokens 410

Reconstruct the image based on the quantized latent tokens by a decoder of the machine learning model 412

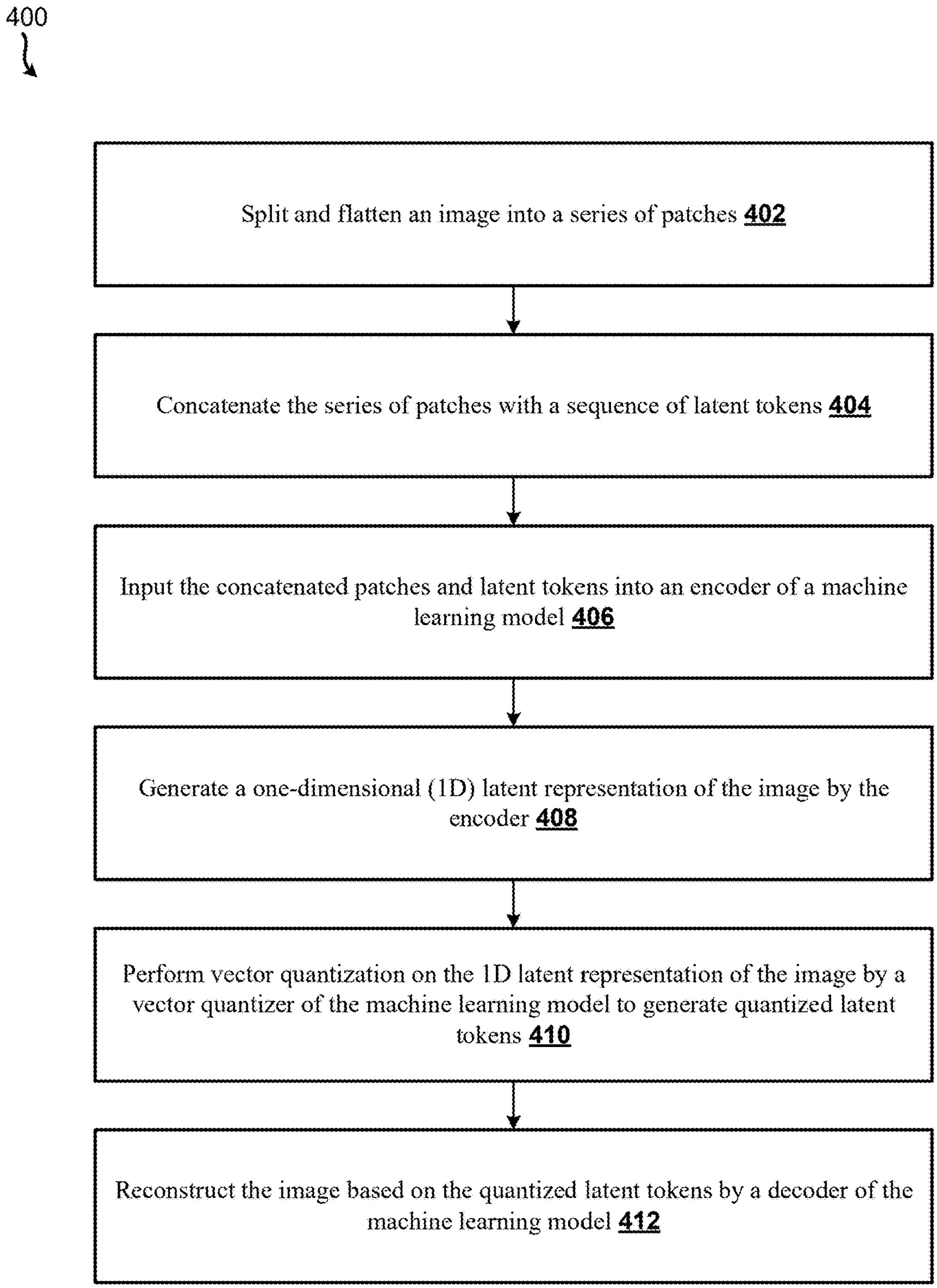

Train a machine learning model using a two-stage training paradigm 702

Perform a first stage of training on the machine learning model using proxy codes to bypass intricate loss functions and generative adversarial network (GAN) architectures, wherein the proxy codes comprise discrete codes generated by an off-the-shelf Vector Quantized GAN (VQGAN) model 704

Perform a second stage of training on the machine learning model to fine-tune the decoder, and wherein the second stage of training comprises only training the decoder towards pixel space with VQGAN losses while keeping the encoder and the vector quantizer frozen 706

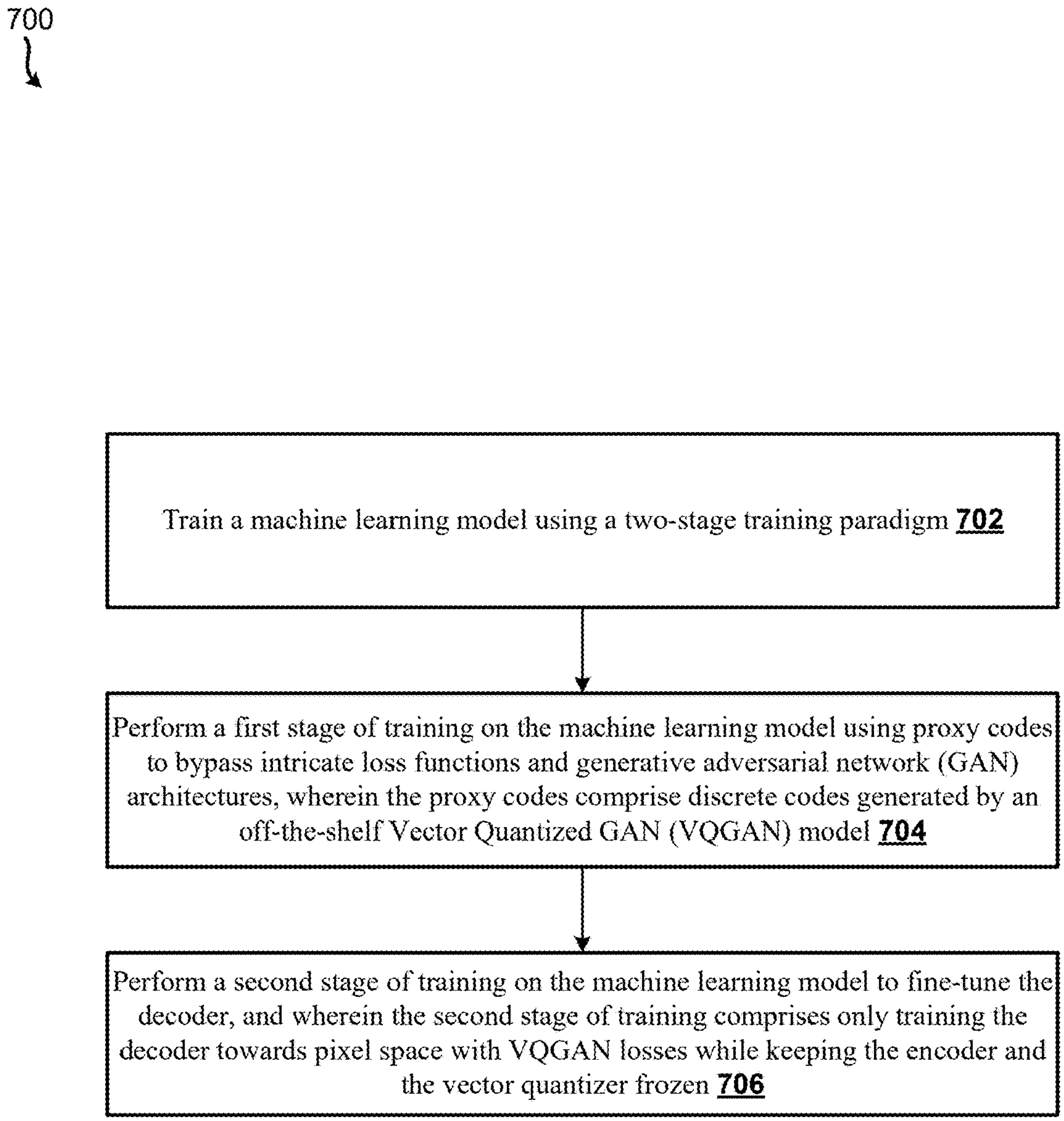

| tokenizer | #tokens | codebook size | rFID↓ | generator | gFID↓ | IS↑ | P | S | T↑ |
|---|---|---|---|---|---|---|---|---|---|
| *diffusion-based generative models* | | | | | | | | | |
| VQGAN† [53] | 1024 | 16384 | 1.14 | LDM-8-G [53] | 7.76 | 209.5 | 258M | 200 | - |
| VAE† [53] | 4096×3 | - | 0.27 | LDM-4-G [53] | 3.60 | 247.7 | 400M | 250 | 0.40 |
| | | | | U-ViT [5] | 2.29 | 263.9 | 501M | 50 | - |
| VAE [1]‡ | 1024×4 | - | 0.62 | DiT-XL/2-G [47] | 2.27 | 278.2 | 675M | 250 | 0.55 |
| | | | | MDT [22] | 1.79 | 283.0 | 676M | 250 | 0.53 |
| *transformer-based generative models* | | | | | | | | | |
| VQGAN [20] | 256 | 1024 | 7.94 | Transformer [20] | 5.88 | 304.8 | 1.4B | 256 | - |
| VQGAN [11] | 256 | 1024 | 2.28 | MaskGIT-ViT [11] | 4.02 | 355.6 | 177M | 8 | - |
| ViT-VQGAN [61] | 1024 | 8192 | 1.28 | VIM [61] | 3.04 | 227.4 | 1.7B | 1024 | - |
| RQ-VAE [35] | 256 | 16384 | 3.20 | RQ-Transformer [35] | 3.80 | 323.7 | 3.8B | 64 | - |
| LFQ [64] | 256 | 262144 | ~0.9 | MAGVIT-v2 [64] | 1.78 | 319.4 | 307M | 64 | - |
| TiTok-L-32 | 32 | 4096 | 2.22 | MaskGIT-ViT [11] | 2.88 | 181.6 | 177M | 8 | 101.6 |
| TiTok-B-64 | 64 | 4096 | 1.70 | MaskGIT-ViT [11] | 2.63 | 207.9 | 177M | 8 | 89.8 |
| TiTok-S-128 | 128 | 4096 | 1.71 | MaskGIT-UViT-L [5, 11] | 2.69 | 271.3 | 295M | 8 | 53.3 |
| | | | | | 2.14 | 270.9 | 295M | 64 | 7.83 |

| tokenizer | #tokens | rFID↓ | generator | FID↓ | IS↑ | #params | #steps |
|---|---|---|---|---|---|---|---|
| *diffusion generative models* | | | | | | | |
| VAE [1]‡ | 4096 | 0.70 | DiT-XL/2-G [37] | 3.04 | 240.8 | 675M | 250 |
| *transformer generative models* | | | | | | | |
| VQGAN [9] | 1024 | 1.97 | MaskGIT [9] | 7.32 | 156.0 | 227M | 12 |
| LFQ [51] | 256 | 1.22* | MAGVIT-v2 [51] | 1.91 | 324.3 | 307M | 64 |
| TiTok-L-K32 | - | - | MaskGIT [9] | - | - | - | - |

| TiTok-L-32 | rFID↓ | IS↑ |
|---|---|---|
| baseline | 6.59 | 110.3 |
| + larger codebook | 5.85 | 116.6 |
| + 200 epochs | 5.48 | 117.3 |
| + decoder finetuning | 2.21 | 195.5 |

| schedule | gFID↓ | IS↑ |
|---|---|---|
| cosine | 5.17 | 191.8 |
| arccos | 4.94 | 194.0 |
| linear | 4.95 | 193.7 |
| root | 5.63 | 170.9 |

| | gFID↓ | IS↑ |
|---|---|---|
| *ViT backbone (177M)* | | |
| TiTok-S-128 | 2.92 | 255.7 |
| TiTok-B-64 | 3.15 | 254.4 |
| TiTok-L-32 | 4.94 | 194.0 |
| *UViT-L backbone (295M)* | | |
| TiTok-S-128 | 2.37 | 288.1 |
| TiTok-B-64 | 3.06 | 239.2 |
| TiTok-L-32 | 5.14 | 186.4 |

FIG. 11C

GENERATION OF LATENT REPRESENTATIONS OF IMAGES USING A MACHINE LEARNING MODEL

BACKGROUND

Machine learning models are increasingly being used across a variety of industries to perform a variety of different tasks. Such tasks may include content generation. Improved techniques for utilizing machine learning models for content generation are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 shows an example process for generating latent representations of images using a machine learning model in accordance with the present disclosure.

FIG. 7 shows an example process for training a machine learning model in accordance with the present disclosure.

FIG. 9 shows an example table illustrating evaluation results in accordance with the present disclosure.

FIG. 10 shows an example table illustrating evaluation results in accordance with the present disclosure.

FIGS. 11A-C show example tables illustrating results for ablation studies in accordance with the present disclosure.

DETAILED DESCRIPTION OF ILLUSTRATIVE EMBODIMENTS

Figure 1:
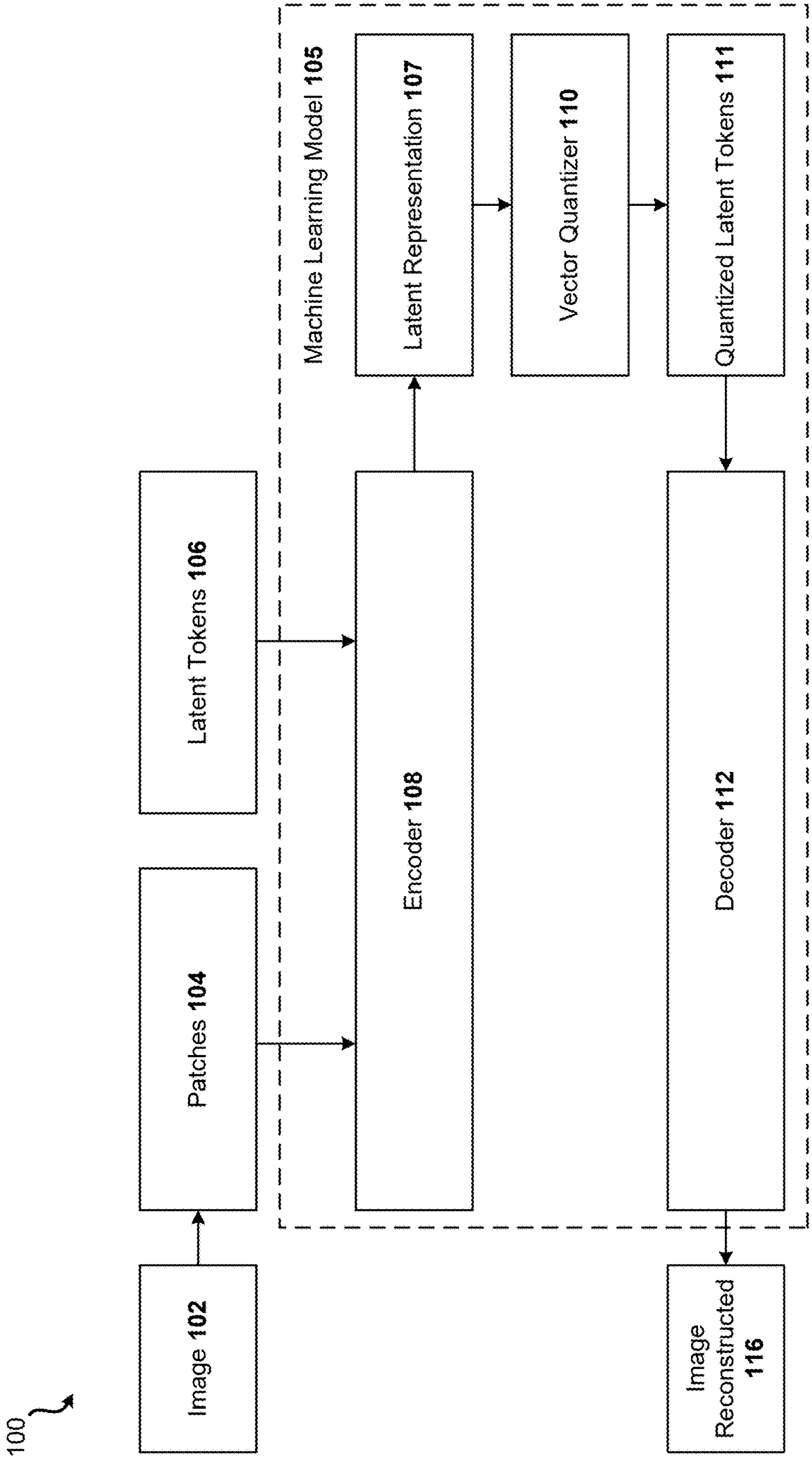
FIG. 1 shows an example system for generating latent representations of images using a machine learning model in accordance with the present disclosure.

In recent years, the field of image generation has experienced remarkable progress, driven by the significant advancements in both transformers and diffusion models. These developments have culminated in the production of images that are more photorealistic and detailed than ever before. Mirroring the trends in generative language models, the architecture of many existing image generation models incorporates a standardized image tokenizer and de-tokenizer. This array of models utilizes tokenized image representations, ranging from continuous to discrete vectors, to perform a critical function: translating raw pixels into a latent image representation. The latent space, significantly more compact than the original image space (e.g., 32×32 vs. 256×256×3), not only facilitates efficient and effective training of generative models but also paves the way for scaling to larger models by offering a condensed yet expressive representation for image synthesis.

Despite the proven success of image tokenizers within image generation workflows, they encounter a fundamental limitation tied to their intrinsic design. These systems presuppose that the latent space retains a two-dimensional (2D) structure, maintaining a direct mapping relationship with corresponding image patches (e.g., the assumption that the top-left latent token directly corresponds to the top-left image patch). This presumption restricts the ability of the tokenizer to effectively leverage the redundancy inherent in images to cultivate a more compressed latent space. Consequently, this limitation also impedes the ability to scale up either the resolution of images or the contextual length. For instance, Llama2, with a context length of 4096, can manage at most four images at a resolution of 256×256 or a single image at 512×512, given that the image tokenizer down samples the image by a factor of eight. While 4096 tokens may encapsulate a rich variety of information in textual contexts, the capacity is markedly constrained in the domain of image tokens, where redundancy is high. Even for commercial large language models (LLMs) with up to one million context length that can process the whole series of Harry Potter books, they can hardly handle a single two-and-half-hour Harry Potter movie that easily makes up to millions of tokens with existing tokenization models.

As such, improved techniques for generating latent representations of images are needed. Described herein are improved techniques for generating latent representations of images. The techniques describe herein leverage a compact one-dimensional (1D) sequence as an image latent representation in the context of image reconstruction and generation. Contrary to existing techniques that leverage a down sampled 2D grid for latent image representation, techniques describe herein utilize a transformer-based framework configured to tokenize an input image into a 1D discrete sequence, which is subsequently decodable back into images via a de-tokenizer. The transformer-based framework described herein can be referred to as Transformer image Tokenizer. The transformer-based framework described herein can include a vision transformer encoder, a ViT decoder, and a vector quantizer. In the tokenization phase, the image can be split and flattened into a series of patches, followed by concatenation with a sequence of latent tokens. The latent tokens generated by the encoder during feature encoding can build the latent representation of the image. Subsequent to the vector quantization step, the decoder can be utilized to reconstruct the input images from the masked token sequence. The transformer-based framework described herein demonstrates notable efficacy in 1D image tokenization.

FIG. 1 shows an example system 100 for generating latent representations of images. The system 100 can include a machine learning model 105. The machine learning model 105 can include an encoder 108, a vector quantizer 110, and a decoder 112. An image 102 can be split and/or flattened into a series of patches 104. The series of patches 104 can be concatenated with a sequence of latent tokens 106. The concatenated patches and latent tokens can be input into the encoder 108 of the machine learning model. The encoder 108 can generate a 1D latent representation 107 of the image 102. The encoder 108 can generate the 1D latent representation 107 of the image 102 based on the concatenated patches and latent tokens. Generating the 1D latent representation 107 can decouple a size of the 1D latent representation 107 from a resolution of the image 102. Generating the 1D latent representation 107 can include generating a 1D sequence. The 1D sequence can have the same size as the sequence of latent tokens 106.

The 1D latent representation 107 can be input into the vector quantizer 110. The vector quantizer 110 can perform vector quantization on the 1D latent representation 107 to generate quantized latent tokens 111. The quantized latent tokens 111 can be input into the decoder 112. The decoder 112 can reconstruct the image based at least on the quantized latent tokens 111. For example, the decoder 112 can generate a reconstructed image 116 based at least on the quantized latent tokens 111. The reconstructed image 116 can be a reconstruction of the image 102. A sequence of mask tokens can be incorporated into the quantized latent tokens 111. The incorporated mask tokens and quantized latent tokens 111 can be input into the decoder 112. The decoder 112 can generate the reconstructed image 116 based on the sequence of mask tokens and the quantized latent tokens 111.

In embodiments, the machine learning model 105 can be trained using a two-stage training paradigm. A first stage of the two-stage training paradigm can include training the machine learning model using proxy codes to bypass intricate loss functions and generative adversarial network (GAN) architectures. The proxy codes can include discrete codes. The discrete codes can be generated by an off-the-shelf Vector Quantized GAN (VQGAN) model. A second stage of the two-stage training paradigm can include training the machine learning model to fine-tune the decoder 112. The second stage of the training paradigm can include only training the decoder 112 towards pixel space with VQGAN losses, while keeping the encoder 108 and the vector quantizer 110 frozen.

Figure 2:
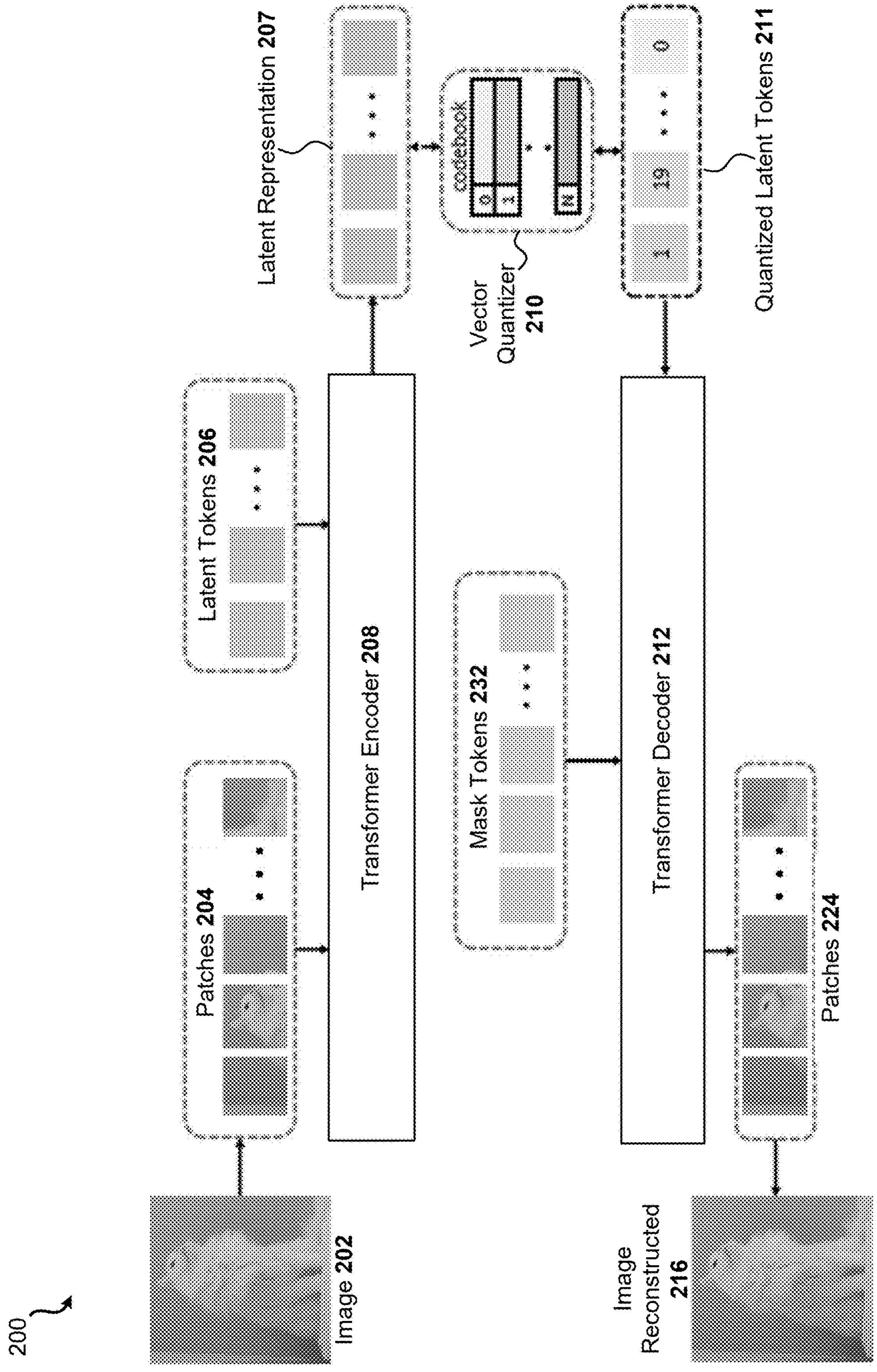
FIG. 2 shows an example system for generating latent representations of images using a machine learning model in accordance with the present disclosure.

FIG. 2 shows an example system 200 for generating latent representations of images. The system 200 can include a machine learning model. The machine learning model can include a transformer encoder 208, the vector quantizer 210, and a transformer decoder 212. The transformer encoder 208 can comprise a ViT encoder. The transformer decoder 212 can comprise a ViT decoder. The transformer encoder 208 can herein be referred to as Enc, the vector quantizer 210 can herein be referred to as Quant, and the transformer decoder 212 can be referred to as Dec.

An image 202 can be denoted as $I \in R^{H \times W \times 3}$, where H and W denote the height and width of the image 202, respectively. The image 202 can be split and/or flattened into a series of patches 204. The series of patches 204 can be denoted as P, where $$P \in R^{\frac{H}{f} \times \frac{W}{f} \times C}$$

(with the patch size equal to the down sampling factor f and dimension C). The series of patches 204 can be concatenated with a sequence of latent tokens 206. The sequence of latent tokens 206 can include K latent tokens. The sequence of latent tokens 206 can be denoted as $L \in R^{K \times C}$.

The concatenated patches and latent tokens can be input into the transformer encoder 208 of the machine learning model. In the input of the transformer encoder 208, only the latent tokens are retained as the latent representation 207 of the image, thereby enabling a more compact latent representation 207. The latent representation 207 can comprise a 1D sequence $Z_{1D}$ (with length K). This adjustment decouples the latent size from the resolution of the image 202 and allows more flexibility in design choices. That is, $Z_{1D}=\mathrm{Enc}(P \oplus L)$, where $\oplus$ denotes concatenation. The latent representation 207 can be input into the vector quantizer 210. The vector quantizer 210 can perform vector quantization on the latent representation 207 to generate quantized latent tokens 211.

In the de-tokenization phase, a sequence of mask tokens 232 can be incorporated to the quantized latent tokens 211. Incorporating the sequence of mask tokens 232 to the quantized latent tokens 211 can include concatenating the quantized latent tokens 211 with the sequence of mask tokens 232. The sequence of mask tokens 232 can be denoted as M, where $$M \in R^{\frac{H}{f} \times \frac{W}{f} \times C}.$$

The sequence of mask tokens 232 can be obtained by replicating a single mask token $$\frac{H}{f} \times \frac{W}{f}$$

times. The transformer decoder 212 can generate a series of reconstructed patches 224. The transformer decoder 212 can generate the series of reconstructed patches 224 based on the concatenated sequence of mask tokens 232 and the quantized latent tokens 211. The series of reconstructed patches 224 can be a reconstruction of the series of patches 204. The image 202 can be reconstructed based on the series of reconstructed patches 224. For example, an reconstructed image 216 can be generated based on the series of reconstructed patches 224. The reconstructed image 216 can be denoted as $\hat{I}$, where $\hat{I}=\mathrm{Dec}(\mathrm{Quan}(Z_{1D}) \oplus M)$.

The machine learning model including the transformer encoder 208, the vector quantizer 210, and the transformer decoder 212 can be trained using a two-stage training paradigm. Given the complexity of the loss functions and the extensive hyper-parameters involved in the machine learning model, training can be unstable, especially when the target is a compact 1D tokenization.

To alleviate the training instability, the machine learning model can be trained using a two-stage training paradigm that utilizes proxy codes. The two-stage training strategy contains "warm-up" and "decoder fine-tuning" stages. Specifically, in the first "warm-up" stage, instead of directly regressing the Red, Green, Blue (RGB) values in pixel space and employing a variety of loss functions (as in existing methods), the machine learning model can be trained with the discrete codes generated by an off-the-shelf VQGAN model, which can be referred to as proxy codes. This allows for the bypassing of intricate loss functions and generative adversarial network (GAN) architectures. This modification does not impinge on the functionality of the transformer encoder 208 and vector quantizer 210, which can still fully function for image tokenization and de-tokenization; the principal adaptation involves the processing of the transformer decoder 212 output. The output of the transformer decoder 212, which can include a set of proxy codes, can be subsequently fed into the same off-the-shelf VQGAN decoder to generate the final RGB outputs.

After the first stage training with proxy codes, a second optional "decoder fine-tuning" stage can be performed to improve the reconstructed image quality. The transformer encoder 208 and vector quantizer 210 can be kept frozen, and only the transformer decoder 212 can be trained towards pixel space with the typical VQGAN losses, including L2 loss, perceptual loss, and adversarial loss. Such a two-stage training strategy significantly improves the training stability and reconstructed image quality.

Figure 3A:
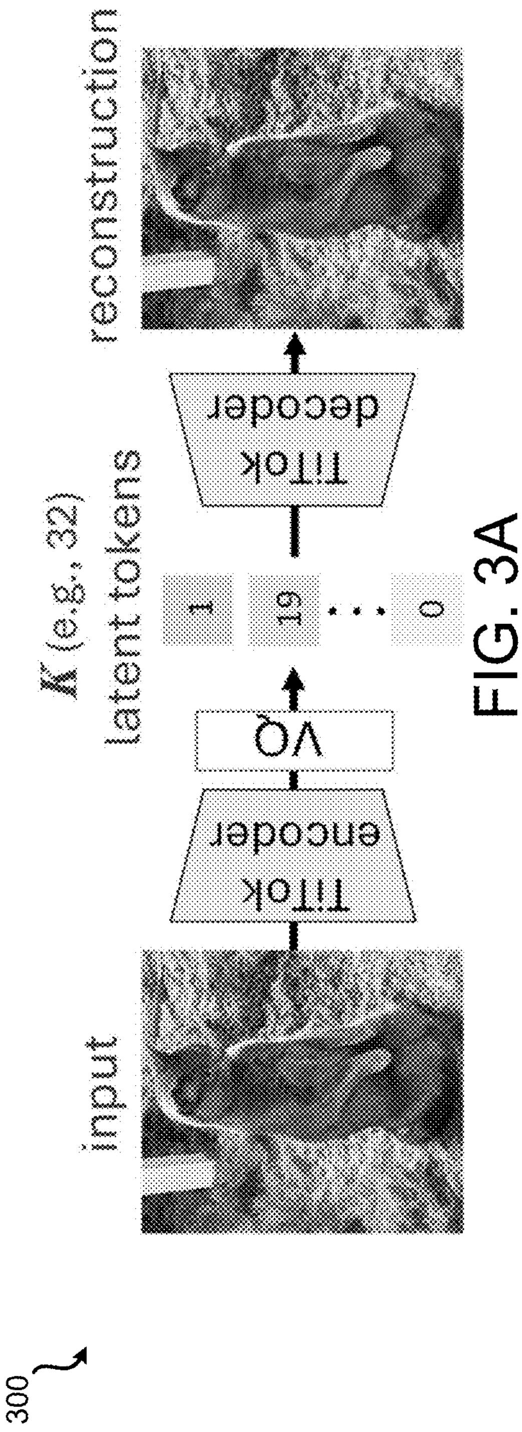
FIGS. 3A-B shows example processes for tokenization of an image in accordance with the present disclosure.
Figure 3B:
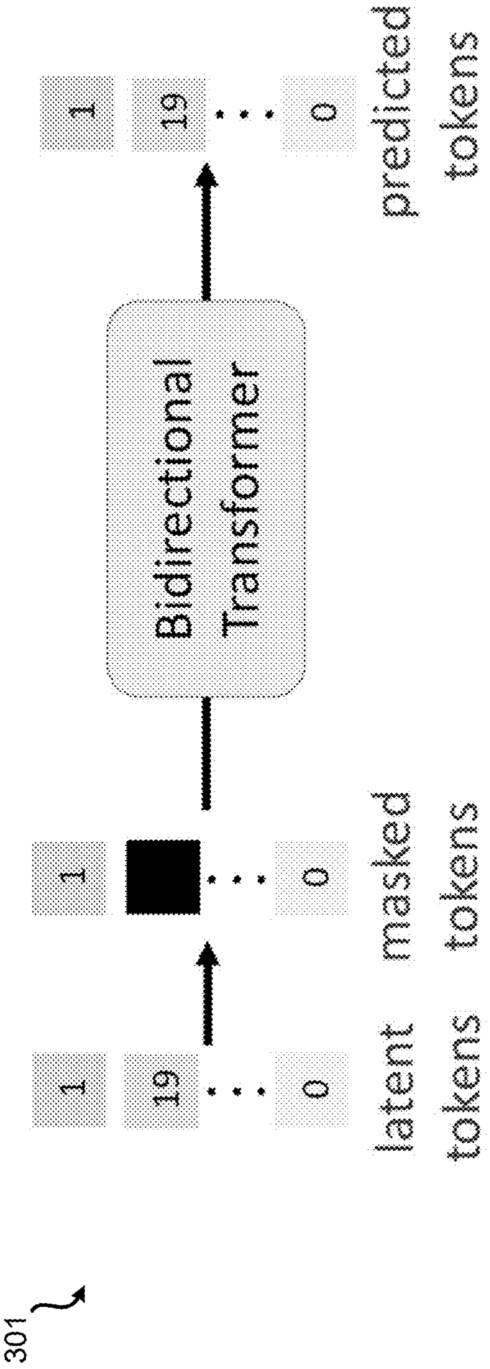

For existing 2D latent representation generation techniques, the latent representation is often envisioned as a static 2D grid. Such a configuration inherently assumes a strict one-to-one mapping between the latent grids and the original image patches. This assumption limits the ability of the model to fully exploit the redundancies present in images, such as similarities among adjacent patches. Additionally, this approach constrains the flexibility in selecting the latent size, with the most prevalent configurations being f=4, f=8 or f=16, resulting in 4096, 1024, or 256 tokens for an image of dimensions 256×256×3. Using 1D latent representations to reconstruct images generates high quality images, in addition to being efficient. Tokenizing an image into a compact 1D sequence with fewer latent tokens (e.g., 32 latent tokens instead of the standard 256) can be used to reconstruct an image, as shown in diagram 300 of FIG. 3A, or to generate an image, as shown in diagram 301 of FIG. 3B. This compact latent space enables more efficient and effective generative model training.

FIG. 4 illustrates an example process 400 for generating efficient and effective latent representations of images using a machine learning model in accordance with the present disclosure. Although depicted as a sequence of operations in FIG. 4, those of ordinary skill in the art will appreciate that various embodiments may add, remove, reorder, or modify the depicted operations.

At 402, an image (e.g., the image 102 or the image 202) can be split and/or flattened into a series of patches (e.g., the series of patches 104 or the series of patches 204). At 404, the series of patches can be concatenated with a sequence of latent tokens (e.g., the sequence of latent tokens 106 or the sequence of latent tokens 206). At 406, the concatenated patches and latent tokens can be input into an encoder (e.g., the encoder 108 or the transformer encoder 208) of a machine learning model (e.g., the machine learning model 105).

At 408, a one-dimensional (1D) latent representation (e.g., the latent representation 107 or the latent representation 207) of the image can be generated by the encoder. Generating the 1D latent representation can include decoupling a size of the 1D latent representation from a resolution of the image. Generating the 1D latent representation can include generating a 1D sequence. The 1D sequence can have the same size as the sequence of latent tokens. The 1D latent representation can be input into a vector quantizer (e.g., the vector quantizer 110 or the vector quantizer 210) of the machine learning model.

At 410, vector quantization can be performed on the 1D latent representation of the image by the vector quantizer to generate quantized latent tokens (e.g., quantized latent tokens 111, quantized latent tokens 211). The quantized latent tokens can be input into a decoder (e.g., the decoder 112 or the transformer decoder 212) of the machine learning model. At 412, the image can be reconstructed. The image can be reconstructed based on the quantized latent tokens. The image can be reconstructed by the decoder.

Figure 5:
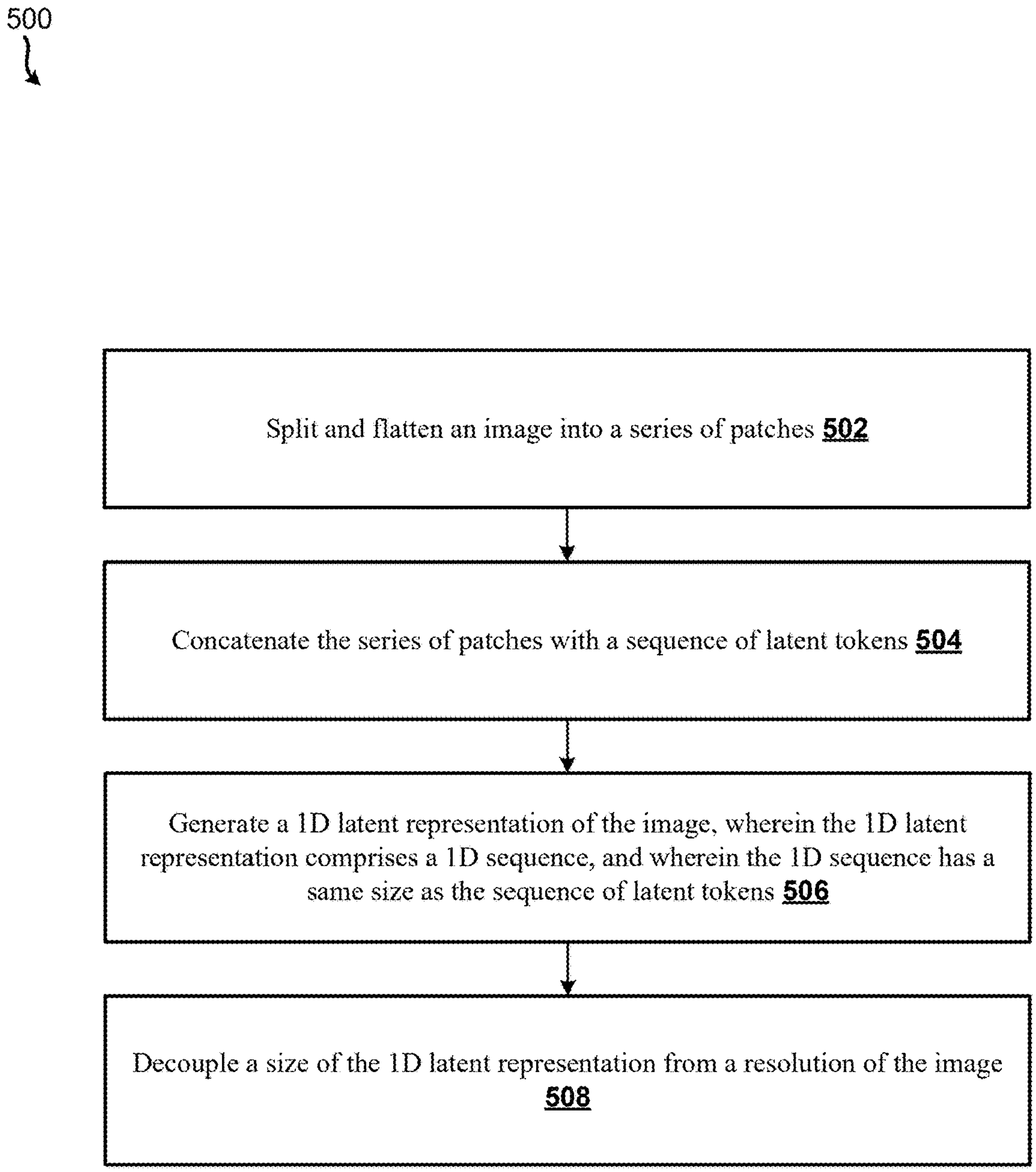
FIG. 5 shows an example process for generating latent representations of images using a machine learning model in accordance with the present disclosure.

FIG. 5 illustrates an example process 500 for generating efficient and effective latent representations of images using a machine learning model in accordance with the present disclosure. Although depicted as a sequence of operations in FIG. 5, those of ordinary skill in the art will appreciate that various embodiments may add, remove, reorder, or modify the depicted operations.

At 502, an image (e.g., the image 102 or the image 202) can be split and/or flattened into a series of patches (e.g., the series of patches 104 or the series of patches 204). At 504, the series of patches can be concatenated with a sequence of latent tokens (e.g., the sequence of latent tokens 106 or the sequence of latent tokens 206).

The concatenated patches and latent tokens can be input into an encoder (e.g., the encoder 108 or the transformer encoder 208) of a machine learning model (e.g., the machine learning model 105). At 506, a 1D latent representation e.g., the latent representation 107 or the latent representation 207) of the image can be generated. The 1D latent representation can comprise a 1D sequence. The 1D sequence can have a same size as the sequence of latent tokens. The 1D latent representation can be generated by the encoder. The 1D latent representation can be generated by the encoder based on the concatenated patches and latent tokens. At 508, a size of the 1D latent representation can be decoupled from a resolution of the image.

Figure 6:
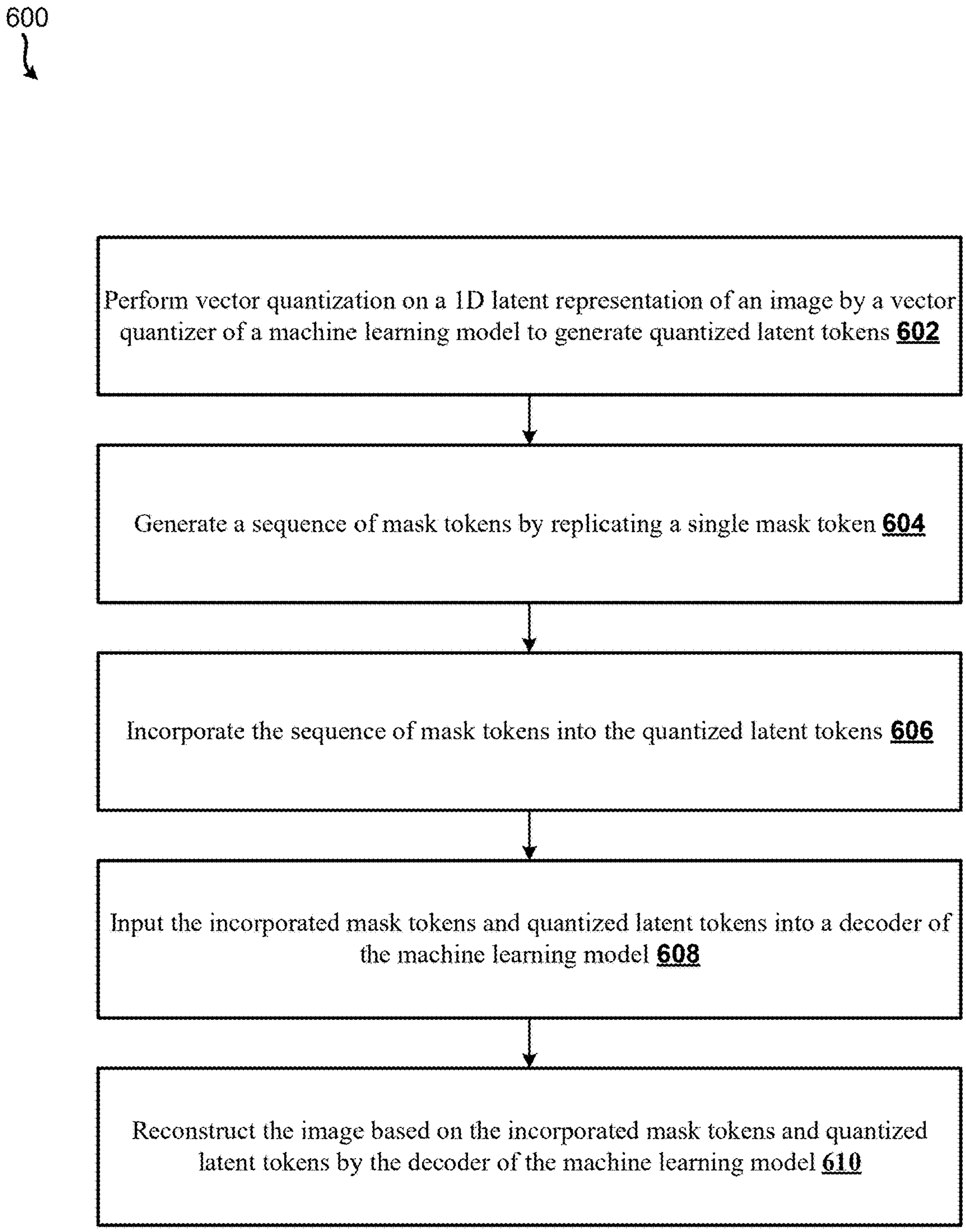
FIG. 6 shows an example process for generating latent representations of images using a machine learning model in accordance with the present disclosure.

FIG. 6 illustrates an example process 600 for generating efficient and effective latent representations of images using a machine learning model in accordance with the present disclosure. Although depicted as a sequence of operations in FIG. 6, those of ordinary skill in the art will appreciate that various embodiments may add, remove, reorder, or modify the depicted operations.

At 602, vector quantization can be performed on a 1D latent representation (e.g., the latent representation 107 or the latent representation 207) of an image (e.g., the image 102 or the image 202) by a vector quantizer (e.g., the vector quantizer 110 or the vector quantizer 210) of a machine learning model to generate quantized latent tokens (e.g., quantized latent tokens 111, quantized latent tokens 211). At 604, a sequence of mask tokens (e.g., the sequence of mask tokens 232) can be generated. The sequence of mask tokens can be generated by replicating a single mask token. At 606, the sequence of mask tokens can be incorporated into the quantized latent tokens. Incorporating the sequence of mask tokens to the quantized latent tokens can include concatenating the quantized latent tokens with the sequence of mask tokens. At 608, the incorporated mask tokens and quantized latent tokens can be input into a decoder (e.g., the decoder 112 or the transformer decoder 212) of the machine learning model. At 610, the image can be reconstructed. The image can be reconstructed based on the incorporated mask tokens and quantized latent tokens. The image can be reconstructed by the decoder of the machine learning model.

FIG. 7 illustrates an example process 700 for training a machine learning model in accordance with the present disclosure. Although depicted as a sequence of operations in FIG. 7, those of ordinary skill in the art will appreciate that various embodiments may add, remove, reorder, or modify the depicted operations.

At 702, a machine learning model (e.g., the machine learning model 105) can be trained using a two-stage training paradigm. At 704, a first stage of training can be performed on the machine learning model. The first stage of training can be performed using proxy codes to bypass intricate loss functions and generative adversarial network (GAN) architectures. The proxy codes can include discrete codes generated by an off-the-shelf Vector Quantized GAN (VQGAN) model. At 706, a second stage of training can be performed on the machine learning model. The second stage of training can be performed to fine-tune a decoder (e.g., the decoder 112 or the transformer decoder 212) of the machine learning model. The second stage of training can include only training the decoder towards pixel space with VQGAN losses while keeping an encoder (e.g., the encoder 108 or the transformer encoder 208) of the machine learning model and a vector quantizer (e.g., the vector quantizer 110 or the vector quantizer 210) of the machine learning model frozen.

The machine learning model described herein (e.g., the machine learning model 105) can be configured in a variety of different ways, can have a variety of different sizes, and can utilize different quantities of latent tokens. Experiments were conducted to identify the most efficient and effective setup for the machine learning model described herein.

For the experiments, the machine learning model was trained with images of resolution H=256 and W=256. The patch size for both tokenizer and de-tokenizer was established at 16, with the codebook C configured to have N=1024 entries and a dimensionality of D=16, incorporating L2 normalization on the codebook embeddings. Training augmentation was confined to random cropping and flipping. The training regimen spans a compressed schedule, featuring a batch size of 256 over 500 k steps, which correlates to roughly 100 epochs. The optimizer was employed with an initial learning rate of $1\times10^{-4}$ and weight decay $1\times10^{-4}$, with cosine decay for the learning rate schedule. Only the stage-1 training (i.e., only the "warm-up" training stage) was used for the experiments.

Three model sizes were evaluated: small, base, and large Transformer image Tokenizer (the models). They include 22 M, 86 M, and 307 M parameters for the encoder and the decoder, respectively. The impact of varying the number of latent tokens K from 16 to 256 was evaluated. In the generative training phase, all images were pre-tokenized using center crop and random flipping augmentation, then processed for image generation via a masked image modeling procedure. A cosine masking schedule was utilized with eight steps. The generative models were trained with a batch size of 2048 and 500 k steps. Additionally, a dropout probability of 0.1 was applied on the class condition. For evaluation, classifier-free guidance with a linear schedule was adopted.

Evaluation was conducted across multiple metrics to thoroughly assess the models, including both reconstruction and generation FID metrics (i.e., rFID and gFID), which gauge performance in image reconstruction and generation tasks, respectively. Given that the 1D VQ model inherently serves as a form of compact image compression, the semantic information retained by the model was investigated through linear probing. Additionally, training throughput was examined to offer a direct comparison of generative model training efficiency relative to different latent sizes.

The redundancy inherent in image representation is well-acknowledged, evidenced by the practice of masking significant portions of images to expedite the training process without detrimentally affecting performance. This strategy has been validated across a variety of computer vision tasks that rely on high-level image features. However, the efficacy of such approaches in the context of image reconstruction and generation, where low-level details are crucial for creating both realistic reconstructed and generated outputs, remains to be fully explored. Consequently, experiments were conducted to ascertain the minimum number of tokens required to reconstruct and generate high-quality images.

Figure 8:
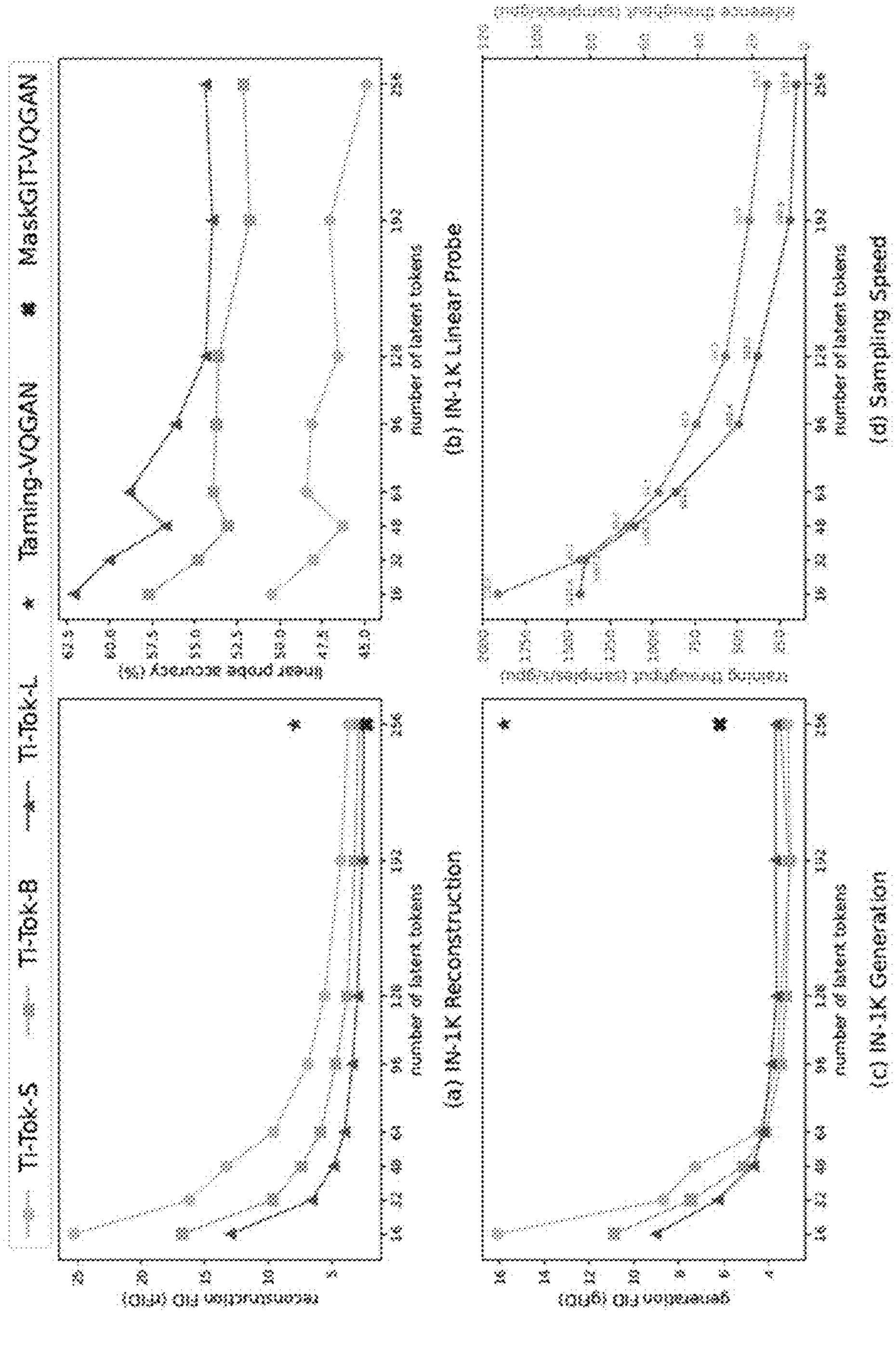
FIG. 8 shows example graphs illustrating evaluation results in accordance with the present disclosure.

FIG. 8 shows results 800 of rFID and gFID with different numbers of latent tokens. As depicted in FIG. 8(*a*), although model performance progressively improves with an increase in the number of latent tokens, significant enhancements are predominantly observed when K ranges from 16 to 128. Beyond this point, augmenting the latent space size yields only marginal gains. With merely 32 latent tokens, the model achieves performance on par with existing models, showing that as few as 32 tokens may suffice as an effective image latent representation, optimizing the utilization of image redundancy.

Scaling up the tokenizer can enable a more compact latent size. As shown in graph (a) of FIG. 8, the larger models facilitate more compact representations. Specifically, the base model with 64 latent tokens achieves performance comparable to the small model with 128 latent tokens, while the large model with 32 latent tokens matches the performance of the base model with 64 latent tokens. This pattern indicates that with each incremental increase in the model size (e.g., from S to B, from B to L), it is possible to reduce the size of the latent image representation without compromising performance. This trend underscores the potential benefits of scaling up the tokenizer to achieve even more compact image representations.

Linear probing experiments were performed on the image tokenizer, as shown in graph (b) of FIG. 8. Specifically, a batch normalization layer was added without an affine transformation, followed by a linear layer, atop the frozen encoded features, adhering to the MAE protocol. As shown in graph (b) of FIG. 8, as the size of the latent representation diminishes, the model increasingly gravitates towards learning semantically rich representations during the tokenization process, as indicated by the improved linear probing accuracy. This shows that the model learns high-level information in scenarios of constrained representation space, while with an enlarged latent space, the model tends to focus more on local textures.

In addition to reconstruction capabilities, the gFID performance of the tokenizers was evaluated to assess their effectiveness in generative downstream tasks, as illustrated in graphs (c) and (d) of FIG. 8. Variants of differing model sizes yield comparable outcomes when the number of latent tokens is sufficiently large (K≥128). Yet, within the domain of compact latent sizes, larger models notably enhance performance. Furthermore, the adaptability of 1D tokenization in the Transformer image Tokenizer facilitates more efficient and effective generative model training. For instance, model variants with K=32, despite inferior reconstruction quality, demonstrate significantly better generative performance, underscoring the advantages of employing a more condensed and semantically rich latent space for generative model training. Additionally, the reduction in latent tokens markedly accelerates training, with a 9.1× increase in training speed (1397.3 vs. 152.9 samples/gpu) and a 5.9× speed up sampling speed (83.7 vs. 14.3 seconds to generate 128 samples) observed when utilizing K=32 as opposed to K=256.

FIG. 9 shows an example table 900 illustrating evaluation results in accordance with the present disclosure. The ability of the machine learning model 105, as well as the ability of existing diffusion generative models and transformer generative models, to reconstruct 256×256 images was evaluated. The results are shown in the table 900. The comparisons shown in the table 900 are based on the best variants with classifier-free guidance or rejection sampling.

As shown in the table 900, the transformer-based framework described herein can achieve a similar level of reconstruction FID (rFID) with a much smaller number of latent tokens than other VQ models. Specifically, using merely 32 tokens, the large model achieves a rFID of 2.22. Furthermore, when using the same generator framework and same sampling steps, the large model improves over existing models by a large margin (from 4.02 to 2.88 gFID), showcasing the benefits of a more effective generator training with compact 1D tokens. When compared to other diffusion-based generative models, the model can also achieve a similar performance while enjoying an over 100× speed-up (measured by throughput) during the sampling process.

FIG. 10 shows an example table 1000 illustrating evaluation results in accordance with the present disclosure. The ability of the machine learning model 105, as well as the ability of existing diffusion generative models and transformer generative models, to reconstruct 512×512 images was evaluated. The results are shown in the table 1000. The comparisons shown in the table 1000 are based on the best variants with classifier-free guidance or rejection sampling. P represents the number of parameters of the generator, S represents the number of sampling steps, and T represents the throughput as samples per seconds on A100.

As shown in the table 1000, the transformer-based framework described herein has a significantly better accuracy-cost trade-off. The model maintains a reasonably good rFID compared to other methods, considering that the model uses much fewer tokens (i.e., higher compression ratio). For generation, all variants as described in the present disclosure outperform existing techniques. When compared with diffusion-based models, the large model with a size of L-64 shows a comparable performance to existing models, while running 455.6× faster. The best variant of base model with a size of B-128 and with 64 steps even shows a significant performance improvement (gFID 2.31 vs. 3.04) and sampling speed-up (7.35 vs. 0.09 samples/s) over existing models.

FIGS. 11A-C show results for ablation studies conducted using the transformer-based framework described herein. FIG. 11A shows a table 1100 illustrating the results of ablating the tokenizer designs (reconstruction task) on the validation set. The large model with 32 tokens attains 6.59 rFID. Employing a larger codebook size improves the rFID by 0.74, while further increasing the training iterations (from 100 epochs to 200 epochs) yields another 0.37 improvement of rFID. On top of that, the "decoder fine-tuning" (the stage-2 training strategy described herein) can substantially improve the overall reconstruction performance to 2.21 rFID.

FIG. 11B shows a table 1101 illustrating the effects of different masking schedules. As shown in the table 1101, the model changes the preference to the arccos or linear schedules. This performance improvement can be attributed to the model's ability to provide a more compact and more semantic meaningful tokens compared to existing models, as compared to the cosine masking schedule, linear and arccos schedules have a lower masking ratio in the early steps. This coincides with the observation that the masking ratio is usually higher for redundant signals (e.g., 75% masking ratio in images) while relatively lower for semantic meaningful inputs (e.g., 15% masking ratio in languages).

FIG. 11C shows a table 1102 showing the results of experiments using an advanced transformer backbone. As shown in the table 1102, this resulted in a substantial improvement for the small model with 128 tokens. This improvement can be attributed to the property of the compact 1D latent representation and the small scale dataset (~1.28 M images). Specifically, the large model with 32 tokens represents each image with simply 32 tokens, thereby effectively condensing the entire training dataset.

Figure 12:
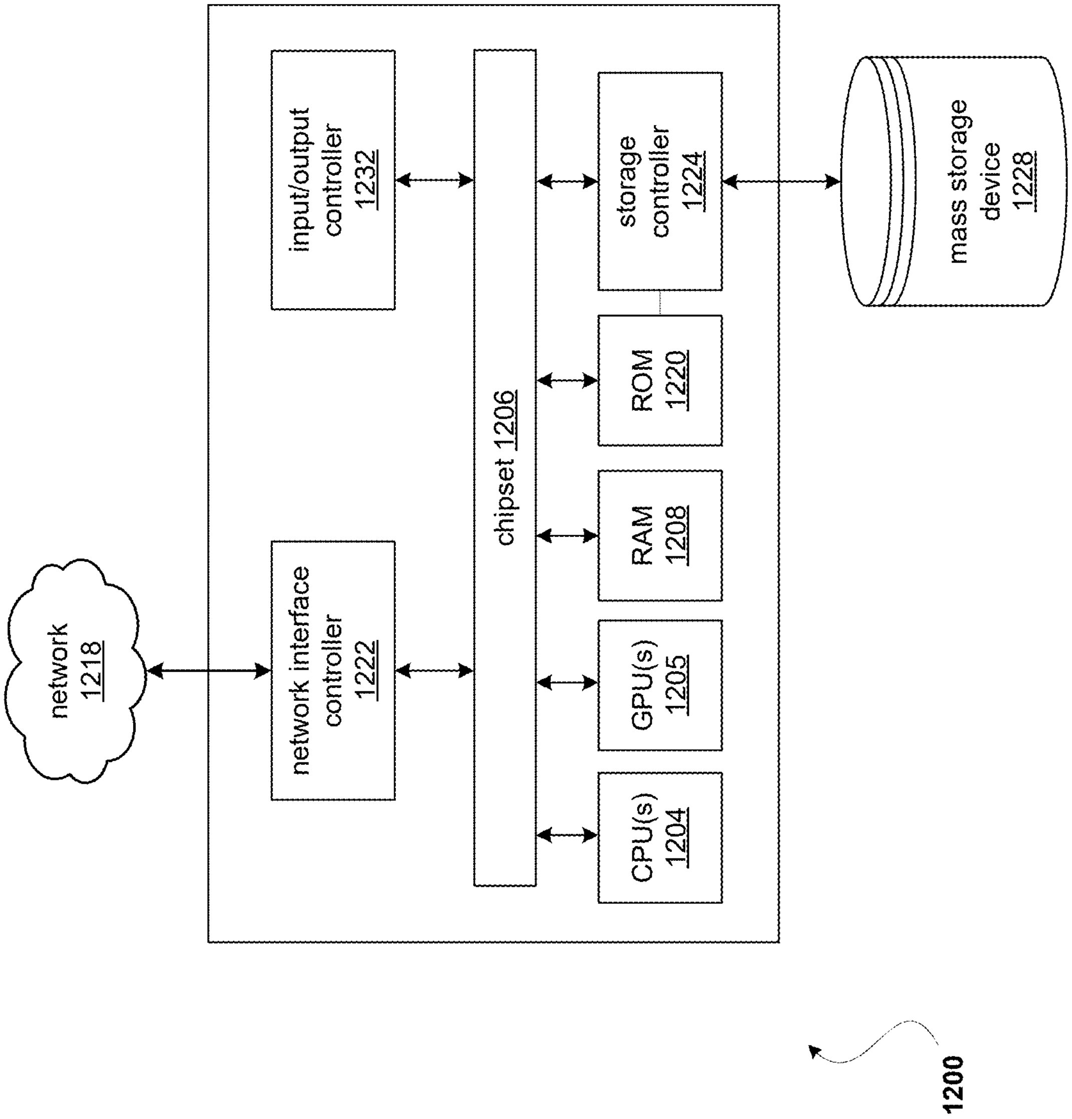
FIG. 12 shows an example computing device which may be used to perform any of the techniques disclosed herein.

FIG. 12 illustrates a computing device that may be used in various aspects, such as the model(s), components, and/or devices depicted in FIGS. 1-2. With regard to FIGS. 1-2, any or all of the components may each be implemented by one or more instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1210. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of generating latent representations of images using a machine learning model, comprising:

splitting and flattening an image into a series of patches;

concatenating the series of patches with a first sequence of latent tokens;

inputting the concatenated series of patches and the first sequence of latent tokens into an encoder of the machine learning model;

generating, by the encoder, a one-dimensional (1D) latent representation of the image, wherein the 1D latent representation of the image comprises a second sequence of latent tokens generated by the encoder during feature encoding of the concatenated series of patches and the first sequence of latent tokens, and wherein a size of the 1D latent representation is decoupled from a resolution of the image;

performing vector quantization on the 1D latent representation of the image by a vector quantizer of the machine learning model to generate quantized latent tokens; and reconstructing the image based on the quantized latent tokens by a decoder of the machine learning model.

2. The method of claim 1, wherein the second sequence of latent tokens comprises a 1D sequence, wherein the 1D sequence has a same size as the first sequence of latent tokens.

3. The method of claim 1, further comprising:

incorporating a sequence of mask tokens into the quantized latent tokens; and inputting the incorporated sequence of mask tokens and quantized latent tokens into the decoder.

4. The method of claim 3, further comprising:

generating the sequence of mask tokens by replicating a single mask token.

5. The method of claim 1, wherein the encoder comprises a Vision Transformer (ViT) encoder, and wherein the decoder comprises a ViT decoder.

6. The method of claim 1, further comprising:

training the machine learning model using a two-stage training paradigm.

7. The method of claim 6, further comprising:

performing a first stage of training on the machine learning model using proxy codes to bypass intricate loss functions and generative adversarial network (GAN) architectures, wherein the proxy codes comprise discrete codes generated by an off-the-shelf Vector Quantized GAN (VQGAN) model.

8. The method of claim 7, further comprising:

performing a second stage of training on the machine learning model to fine-tune the decoder, and wherein the second stage of training comprises only training the decoder towards pixel space with VQGAN losses while keeping the encoder and the vector quantizer frozen.

9. A system of generating latent representations of images using a machine learning model, comprising:

at least one processor; and at least one memory communicatively coupled to the at least one processor and comprising computer-readable instructions that upon execution by the at least one processor cause the at least one processor to perform operations comprising:

splitting and flattening an image into a series of patches;

concatenating the series of patches with a first sequence of latent tokens;

inputting the concatenated series of patches and the first sequence of latent tokens into an encoder of the machine learning model;

generating, by the encoder, a one-dimensional (1D) latent representation of the image, wherein the 1D latent representation of the image comprises a second sequence of latent tokens generated by the encoder during feature encoding of the concatenated series of patches and the first sequence of latent tokens, and wherein a size of the 1D latent representation is decoupled from a resolution of the image;

performing vector quantization on the 1D latent representation of the image by a vector quantizer of the machine learning model to generate quantized latent tokens; and reconstructing the image based on the quantized latent tokens by a decoder of the machine learning model.

10. The system of claim 9, wherein the second sequence of latent tokens comprises a 1D sequence, wherein the 1D sequence has a same size as the first sequence of latent tokens.

11. The system of claim 9, the operations further comprising:

generating a sequence of mask tokens by replicating a single mask token;

incorporating the sequence of mask tokens into the quantized latent tokens; and inputting the incorporated sequence of mask tokens and quantized latent tokens into the decoder.

12. The system of claim 9, wherein the encoder comprises a Vision Transformer (ViT) encoder, and wherein the decoder comprises a ViT decoder.

13. The system of claim 9, the operations further comprising:

training the machine learning model using a two-stage training paradigm.

14. The system of claim 13, the operations further comprising:

performing a first stage of training on the machine learning model using proxy codes to bypass intricate loss functions and generative adversarial network (GAN) architectures, wherein the proxy codes comprise discrete codes generated by an off-the-shelf Vector Quantized GAN (VQGAN) model; and performing a second stage of training on the machine learning model to fine-tune the decoder, and wherein the second stage of training comprises only training the decoder towards pixel space with VQGAN losses while keeping the encoder and the vector quantizer frozen.

15. A non-transitory computer-readable storage medium, storing computer-readable instructions that upon execution by a processor cause the processor to implement operations comprising:

splitting and flattening an image into a series of patches;

concatenating the series of patches with a first sequence of latent tokens;

inputting the concatenated series of patches and the first sequence of latent tokens into an encoder of the machine learning model;

generating, by the encoder, a one-dimensional (1D) latent representation of the image, wherein the 1D latent representation of the image comprises a second sequence of latent tokens generated by the encoder during feature encoding of the concatenated series of patches and the first sequence of latent tokens, and wherein a size of the 1D latent representation is decoupled from a resolution of the image;

performing vector quantization on the 1D latent representation of the image by a vector quantizer of the machine learning model to generate quantized latent tokens; and reconstructing the image based on the quantized latent tokens by a decoder of the machine learning model.

16. The non-transitory computer-readable storage medium of claim 15, wherein the second sequence of latent tokens comprises a 1D sequence, wherein the 1D sequence has a same size as the first sequence of latent tokens.

17. The non-transitory computer-readable storage medium of claim 15, the operations further comprising:

generating a sequence of mask tokens by replicating a single mask token;

incorporating the sequence of mask tokens into the quantized latent tokens; and inputting the incorporated sequence of mask tokens and quantized latent tokens into the decoder.

18. The non-transitory computer-readable storage medium of claim 15, wherein the encoder comprises a Vision Transformer (ViT) encoder, and wherein the decoder comprises a ViT decoder.

19. The non-transitory computer-readable storage medium of claim 15, the operations further comprising:

training the machine learning model using a two-stage training paradigm.

20. The non-transitory computer-readable storage medium of claim 19, the operations further comprising:

performing a first stage of training on the machine learning model using proxy codes to bypass intricate loss functions and generative adversarial network (GAN) architectures, wherein the proxy codes comprise discrete codes generated by an off-the-shelf Vector Quantized GAN (VQGAN) model; and performing a second stage of training on the machine learning model to fine-tune the decoder, and wherein the second stage of training comprises only training the decoder towards pixel space with VQGAN losses while keeping the encoder and the vector quantizer frozen.

* * * * *